UNITED STATES PATENT OFFICE 2,648,693

POLYALKYLENE GLYCOL ESTERS OF ALKYLTETRAHYDROPHENYLALKANOIC ACIDS

Louis Schmerling, Riverside, Ill., assignor to Universal Oil Products Company, Chicago, Ill., a corporation of Delaware No Drawing. Application January 27, 1951, Serial No. 208,234

12 Claims. (Cl. 260—410.6)

This invention relates to the products and to the process for the manufacture of certain members of an homologous series of organic compounds which are useful as surface active agents, detergents, wetting and sudsing agents or emulsifiers. More specifically, the invention concerns a process for preparing certain alkyltetrahydrophenylalkanoic acid salts of alkali metal bases and esters of polyalkylene glycols as well as to the products themselves which have surface active properties in aqueous solution.

The products of the present invention are characterized as alkyltetrahydrophenylalkanoic (or alkylcyclohexenylalkanoic) acid salts and esters having the empirical structural formula:

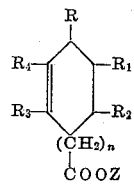

wherein R, $R_1$, $R_2$, $R_3$ and $R_4$ are selected from the group consisting of hydrogen, a long chain alkyl substituent containing from 4 to about 15 carbon atoms per substituent, and an alkyl radical containing from 1 to 3 carbon atoms per radical, one and only one of said alkyl radicals being a long chain alkyl substituent, $n$ is equal to a whole number having a value of from 0 to 10, Z is selected from the group consisting of an alkali metal or ammonium radical, and a polyoxyalkylene radical containing from 5 to about 25 oxyalkylene units per radical in which the alkylene group contains from 2 to 5 carbon atoms per alkylene group.

Another embodiment of the invention concerns a process for the manufacture of a surface active agent which comprises condensing an olefinic hydrocarbon with a conjugated dienoic acid and reacting the resulting alkyltetrahydrophenylalkanoic acid with a compound selected from the group consisting of an alkali metal, ammonium, and amino base and a polyalkylene glycol, said glycol containing from 5 to about 25 oxyalkylene groups per molecule and from about 2 to about 5 carbon atoms per alkylene group.

The alkyltetrahydrophenylalkanoic acid intermediate of the present product and process is prepared in an initial stage of the process by the condensation of a dienoic aliphatic acid in which the dienoic unsaturation is conjugated with a monoolefinic hydrocarbon at reaction conditions sufficient to form a Diels-Alder type of condensation product. In order to form products having surface activity in aqueous or organic solvents, the polar activity of the hydrophilic carboxyl group must in general balance the hydrophobic properties of the hydrocarbon portion of the molecule and furthermore, must have a structure capable of orientation in solution such that when the product is dissolved in an appropriate solvent therefor, the hydrophilic and hydrophobic portions of the detergent molecules form a micellar aggregate. It has been found that the requisite balance of hydrophobic and hydrophilic properties of the hydrocarbon and carboxyl groups of the present surface active agents when dissolved in a suitable solvent is obtained when one and not more than one of the alkyl groups attached to the tetrahydrophenylalkanoic acid nucleus of the compound contains at least 4 and not more than about 15 carbon atoms per alkyl group. In general, the chain length of this alkyl group, referred to herein as a long chain alkyl substituent, may be shorter within the minimum and maximum range indicated above when another or a maximum of four other alkyl groups are present on the tetrahydrophenylalkanoic acid nucleus, the number of carbon atoms in the long chain alkyl groups required for the final product to exhibit detergency in general decreasing as the number of alkyl groups in addition to the long chain alkyl group and the chain lengths thereof increases. The mechanism of the condensation reaction which forms the alkyltetrahydrophenylalkanoic acid intermediate of the present invention is represented empirically in the following:

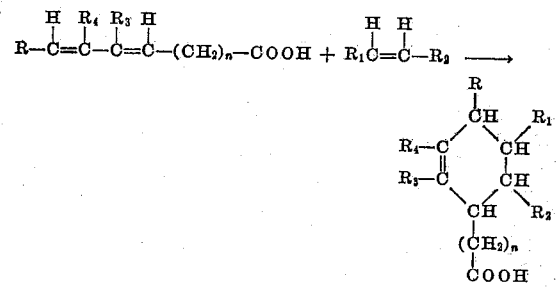

It is evident from the above mechanism that a variety of homologous compounds may be prepared by the selection of appropriate olefinic hydrocarbons and dienoic acid reactants. In general, the long chain alkyl group may be derived from either the aliphatic dienoic acid or the olefinic hydrocarbon reactant.

Suitable dienoic acids utilizable in the condensation reaction to form the intermediate tetrahydrophenylalkanoic acid derivative are selected from the monocarboxylic, aliphatic dienoic acids containing at least 5 carbon atoms per molecule, such as beta-vinylacrylic acid (pentadien-2,4-oic acid), sorbic acid (hexadiene-2,4-oic acid), isomerized geranic acid (3,7-dimethyloctadiene-2,4-oic acid), isomerized linoleic acid (octadecadiene-9,11-oic acid), and others of similar structure. One of the preferred dienoic acid reactants is sorbic acid which is relatively easily obtained from the natural sources, and, further, produces desirable surface active agents when condensed with the proper olefinic hydrocarbons in accordance with the present process. It is to be noted that the long chain alkyl group may be introduced into the structure of the tetrahydrophenylalkanoic acid intermediate by the proper selection of the proper dienoic acid, although ordinarily the long chain group is the alkyl residue attached to the ethylenic carbon atoms of the olefin reactant. Thus, when utilizing a sufficiently long chain aliphatic carboxylic acid in the condensation reaction, in which the unsaturation occurs in the aliphatic chain other than on the alpha and gamma carbon atoms or when the unsaturation in the dienoic acid is on the alpha and gamma carbon atoms and the acid contains more than 8 carbon atoms per molecule, as in the case of isomerized linoleic acid, wherein the diene unsaturation is on the 9 and 11 carbon atoms, the resulting condensation product will contain a long chain alkyl group having at least 4 carbon atoms per group. Of the indicated conjugated dienoic acids utilizable in the condensation reaction, the alpha, gamma dienoic acids are preferred, the latter acid reactants forming the preferred alkyl benzoic acid derivatives.

The starting material referred to herein as an olefinic hydrocarbon may contain from 2 to any larger number of carbon atoms which will result, on condensation with the dienoic acid, in the formation of an alkyltetrahydrophenylalkanoic acid containing one and only one long chain alkyl group having from about 4 to about 15 carbon atoms per group and not more than three additional alkyl groups, each containing less than 4 carbon atoms per group. Thus, ethylene, propylene, n-butylene, isobutylene, 3-pentene, isoamylene, and homologs thereof, including the various isomers, containing up to about 20 carbon atoms per molecule may be utilized in the condensation reaction to form the alkyltetrahydrophenylalkanoic acid intermediate of the above indicated structure. One of the preferred types of olefinic hydrocarbon reactants is a normal 1-olefin which yields a condensation product in which the nuclear tetrahydrophenyl substituents: $R_1$ or $R_2$ of the above empirical formula is hydrogen. It will be evident from the desired indicated structure of the condensation product that when utilizing a short chain olefin, such as ethylene, propylene, a butylene, etc. in the condensation reaction, the dienoic acid reactant must necessarily contain a long chain alkyl group in order to form a condensation product containing a long chain alkyl group. On the other hand when utilizing a long chain olefinic reactant it is likewise evident that a short chain dienoic acid such as beta-vinylacrylic acid or sorbic acid must necessarily be utilized in the condensation reaction to form a product containing not more than one of the indicated long chain alkyl groups. The proper selection of the dienoic acid and olefinic reactants involved in the condensation reaction will ultimately depend upon the desired end product, depending upon whether an emulsifying agent, a wetting agent, or a detergent is desired as the ultimate product of the present process. In general, products having the greatest water-solubility are formed when the reactants are chosen to yield a product containing a minimum of hydrocarbon residue attached to the hydrophilic carboxylic acid salt or ester radical.

The condensation of the dienoic acid reactant and olefinic hydrocarbon reactant may be effected at temperatures of from about 150° to about 250° C., and preferably from about 180 to about 220° C., while maintaining the pressure sufficiently superatmospheric to provide essentially liquid phase conditions within the reaction zone. Although the desired condensation reaction proceeds to an appreciable degree in the absence of any recognized catalytic agent, small amounts of substances such as hydroquinone, anthraquinone, acetylenedicarboxylic acid, and trichloroacetic acid may be added to the reaction mixture to promote the condensation reaction and enhance the yield of desired condensation product. The latter substances which promote the condensation reaction in the true sense of catalysts may be recovered from the condensation product by suitable extraction or precipitation means. In general, amounts of the catalysts of the order of from about 1 to about 10% by weight of the reaction mixture are generally found to be effective in promoting the condensation reaction.

Following completion of the condensation reaction to form the alkyltetrahydrophenylalkanoic acid derivative, the latter product is neutralized with a basic neutralizing agent selected from the alkali metal oxides, hydroxides, carbonates, etc., ammonia, an alkyl amine, or an alkanol amine to form an anionic detergent or the product may be esterified with a polyalkylene glycol by reaction with an alkylene oxide or with a polyalkylene glycol to form a nonionic detergent. Suitable neutralizing agents to form the anionic detergents include the hydroxides and carbonates of sodium and potassium, ammonium hydroxide, a mono-di-, or tri-alkyl amine, such as dimethylamine, methylethylamine, butylmethylamine, or an alkanol amine, such as the mono-, di-, and triethanolamines, the latter ammonium hydroxide, alkylamines and alkanol amines being designated as amine bases or ammonium and alkyl ammonium bases which form ammonium salt detergents which are particularly suitable for use in applications in which alkali sensitivity is to be avoided, as for example, for shampoos and emulsifiers in hand creams. The neutralization of the alkyltetrahydrophenylalkanoic acid intermediate product is readily effected by merely mixing an aqueous solution of the neutralizing agent, such as sodium hydroxide, with the intermediate acid product until substantial neutrality is obtained.

The alternative nonionic detergent products of this invention are particularly adapted for use in "hard" water deterging operations in which calcium and/or magnesium ions are present and which result in the formation of undesirable, water-insoluble precipitates when the anionic form of the present detergent is utilized therewith. The generally more desirable nonionic form of the present product is prepared by converting the alkyltetrahydrophenylalkanoic acid intermediate product to a polyalkylene glycol ester containing from about 2 to about 25 polyoxyalkylene groups per molecule in which the alkylene groups contain from 2 to about 5 carbon atoms per group. Although polyethylene glycol and ethylene oxide are the preferred reactants utilizable in the preparation of the carboxylic acid ester because they are more readily obtained at a lower cost and generally form more readily water-soluble products, other polyalkylene glycols and alkylene oxides, such as propylene oxide and polypropylene glycols, butylene oxide and polybutylene glycols, etc. may likewise be utilized in the esterification reaction, especially when a product which is less soluble in water and more soluble in organic solvents, such as hydrocarbons, is desired as the ultimate detergent product. The polyoxyalkylene glycols usually consist of a mixture of various polymers within a definite range of molecular weight, and where the number of polyoxyalkylene groups per molecule are specified herein as being within a range of values, the limits specified are intended to designate an average number of oxyalkylene units for the fraction utilized. In the formation of the latter carboxylic acid ester products, the alkyltetrahydrophenylalkanoic acid intermediate product is condensed with the alkylene oxide at temperatures of from about 30° to about 100° C. and preferably at superatmospheric pressures sufficient to maintain the reactants in substantially liquid phase at the indicated temperature, the alkylene oxide and carboxylic acid reactants merely undergoing condensation to form the ester. When utilizing a polyalkylene glycol as the reactant to form the ester, the glycol of the desired molecular weight is combined with the carboxylic acid and the stirred mixture heated to temperatures of from about 80° to about 120° C., preferably in the presence of an acid catalyst, such as 0.01 to 1% of a strong mineral acid, including sulfuric acid, hydrochloric acid, and phosphoric acid. The resulting esterification is desirably accompanied by continuously removing the water formed by the condensation of the hydroxyl and carboxylic acid groups from the reaction mixture, for example, by continuous distillation from the reaction vessel. The selection of the preferred alkylene oxide or polyalkylene glycol utilized in the condensation is dependent upon the ultimate use intended for the product, that is, whether intended for use in organic solvents or for use in aqueous solvents. Thus, a relatively water-insoluble surface active agent may be prepared by forming an ester of a low molecular weight polyethylene glycol generally containing from about 5 to about 10 oxyethylene groups per molecule, depending upon the length of the long chain alkyl substituent or an ester of a higher molecular weight alkylene glycol, such as a polybutylene glycol or a polyamylene glycol. On the other hand, the water solubility of the product increases as the number of oxyalkylene groups in the ester linkage increases and the chain length of the alkylene group of the polyoxyalkylene radical decreases.

The yield of ester product may be increased in many instances by forming an acid chloride derivative of the alkyltetrahydrophenylalkanoic acid intermediate and thereafter reacting the acid chloride with the desired polyalkylene glycol. The acid chloride is readily prepared by reacting the alkyltetrahydrophenylalkanoic acid with phosphorous pentachloride and removing the by-product phosphorous trichloride from the reaction mixture. The condensation of the acid chloride with the polyalkylene glycol is readily effected at relatively low temperatures, from about 0° to about 50° C. to form the polyalkylene glycol ester product.

The products of the present invention are in general similar in their physical properties to the fatty acid soaps and may be utilized in many of the applications to which soap is adapted. The anionic carboxylic acid soaps are generally mucilaginous when dissolved in water and produce a desirable "feel" characteristic of the common soaps now in general use. The nonionic carboxylic acid esters of the polyalkylene glycols are wax-like products, the water-soluble members of which also have soap-like characteristics insofar as their mucilaginous qualities are concerned. When utilized for deterging purposes, such as in commercial or domestic laundering, the present products may be composited with water softeners, extenders, builders, dyes, etc. and may be cast in flake, bar, or pellet form either individually or in composition with soap. The water-insoluble forms of the present product may be utilized as detergents in dry-cleaning compositions, as detergents in non-aqueous solvents, such as hydrocarbons, and as lubricating oil additives, while both the water-soluble and insoluble forms may be utilized as emulsifying agents, as wetting agents and for a multitude of other uses for which detergents and surface active agents are applicable.

The present invention is further illustrated with respect to specific embodiments thereof, such as charging stocks and specific reaction conditions in the following illustrative examples.

*Example I*

4-methyl - 5 - hexyl - 2-cyclohexene carboxylic acid was obtained by reacting sorbic acid (2,4-hexadienoic acid) with 1-octene at condensation reaction conditions. 30 grams of sorbic acid and 40 grams of 1-octene were charged into the glass liner of an 850 cc. rotating pressure autoclave. The pressure was increased in the autoclave to 50 atmospheres by charging nitrogen into the autoclave to the latter pressure. The reactants were then mixed by rotation of the autoclave at a temperature of 200° C. for a reaction period of 6 hours. A maximum pressure of 90 atmospheres was obtained during the reaction. The liquid product in the liner (65 g.) was distilled to produce a residue of 20 grams which was reacted with a 10% aqueous solution of sodium hydroxide. The residue dissolved in the caustic to form a light orange-colored solution. The latter was steam distilled to remove an additional 4 cc. of excess 1-octene. Acidification of the aqueous solution and recrystallization of the precipitated acid yielded a crystalline acid having a melting point of 115–120° C. The sodium salt dissolved in water foams readily when shaken in solution and the salt is a good detergent.

The carboxylic acid obtained as indicated above was mixed with an equal weight of phosphorous pentachloride, the mixture forming a liquid which was heated to the boiling point of the liquid for 0.5 hour and thereafter mixed with a polyethylene glycol containing an average of 9 polyoxyethylene units per molecule. The resulting mixture was heated to 100° C. for 0.5 hour to form a viscous semi-solid product which dissolved readily in water. An aqueous solution of the ester containing about 0.3% by weight of the ester has detersive properties as indicated by its ability to remove soil from cotton swatches in the standard Launder-O-Meter detergent test procedure.

The carboxylic acid formed in the condensation of sorbic acid with 1-octene may also be esterified with polyethylene glycol by reacting the condensation product with the glycol in the presence of several drops of concentrated sulfuric acid as esterification catalyst.

The preparation of other alkyltetrahydrophenylalkanoic acid esters of polyethylene glycols and salts of the alkali metals indicates that the esters and salts containing not more than one alkyl group having from 4 to about 15 carbon atoms per group are effective surface active agents, and other alkyl groups, such as methyl radicals may be present on the tetrahydrophenylalkanoic acid nucleus.

I claim as my invention:

1. A compound having the empirical structural formula:

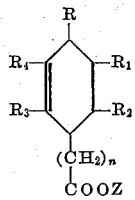

wherein R, $R_1$, $R_2$, $R_3$ and $R_4$ are selected from the group consisting of hydrogen, a long chain alkyl substituent containing from 4 to about 15 carbon atoms per substituent, and an alkyl radical containing from 1 to 3 carbon atoms per radical, one and only one of said alkyl radicals being a long chain alkyl substituent, $n$ is equal to a whole number having a value of from 0 to 10, and Z is a polyoxyalkylene radical containing from 5 to about 25 oxyalkylene units per radical in which the alkylene group contains from 2 to 5 carbon atoms per alkylene group.

2. A compound as defined in claim 1 further characterized in that said polyoxyalkylene radical is a polyoxyethylene group.

3. A compound as defined in claim 1 further characterized in that said long chain alkyl substituent contains 6 carbon atoms.

4. A process for the manufacture of a surface active agent which comprises condensing an olefinic hydrocarbon with a conjugated dienoic acid to form an alkyltetrahydrophenylcarboxylic acid.

5. The process of claim 4 further characterized in that said conjugated dienoic acid is an alpha, gamma dienoic acid.

6. The process of claim 4 further characterized in that said conjugated dienoic acid is sorbic acid.

7. The process of claim 4 further characterized in that said conjugated dienoic acid is a 9, 11-dienoic linoleic acid.

8. The process of claim 4 further characterized in that said olefinic hydrocarbon contains at least 6 carbon atoms per molecule.

9. The process of claim 4 further characterized in that said olefinic hydrocarbon is a 1-normal olefin containing at least 6 carbon atoms per molecule.

10. The process of claim 4 further characterized in that said acid is reacted with a polyalkylene glycol containing an average of from about 5 to about 25 oxyalkylene groups per molecule.

11. A process for the manufacture of a surface active agent which comprises condensing an olefinic hydrocarbon with a conjugated dienoic acid, reacting the resulting alkyltetrahydrophenylalkanoic acid with phosphorous pentachloride to form the corresponding carboxylchloride and reacting said carboxylchloride with a polyalkylene glycol containing from 5 to about 25 oxyalkylene groups per molecule and from about 2 to about 5 carbon atoms per alkylene group.

12. A process for the manufacture of a surface active agent which comprises condensing an olefinic hydrocarbon with a conjugated dienoic acid and reacting the resulting alkyltetrahydrophenylalkanoic acid in the presence of a strong mineral acid catalyst with a polyalkylene glycol containing from 5 to about 25 oxyalkylene groups per molecule and from about 2 to about 5 carbon atoms per alkylene group.

LOUIS SCHMERLING.

References Cited in the file of this patent

UNITED STATES PATENTS

| Number | Name | Date |
| --- | --- | --- |
| 1,961,623 | Pelton | June 5, 1934 |
| 1,970,578 | Schoeller et al. | Aug. 21, 1934 |
| 2,349,232 | Joshel | May 16, 1944 |
| 2,352,606 | Alden et al. | July 4, 1944 |
| 2,563,206 | Bergmann | Aug. 7, 1951 |

OTHER REFERENCES

DuBois, Chem. Abst., vol. 39 (1945), p. 1143.

Holmes, "Organic Reactions," 1948, vol. IV, Chap 2, pp. 60–173; John Wiley and Sons, New York, N. Y.